Oct. 17, 1967   F. KOPPELMANN   3,348,110
ELECTRONIC CONTROL OF MOTORS
Filed Oct. 23, 1964   2 Sheets-Sheet 1
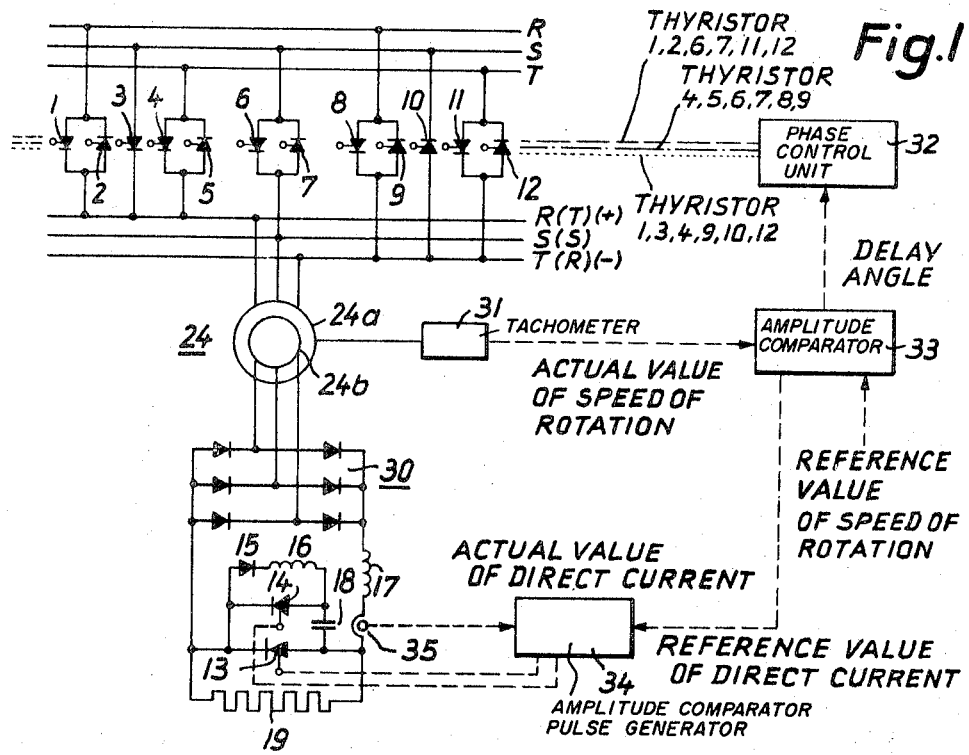
Fig.1
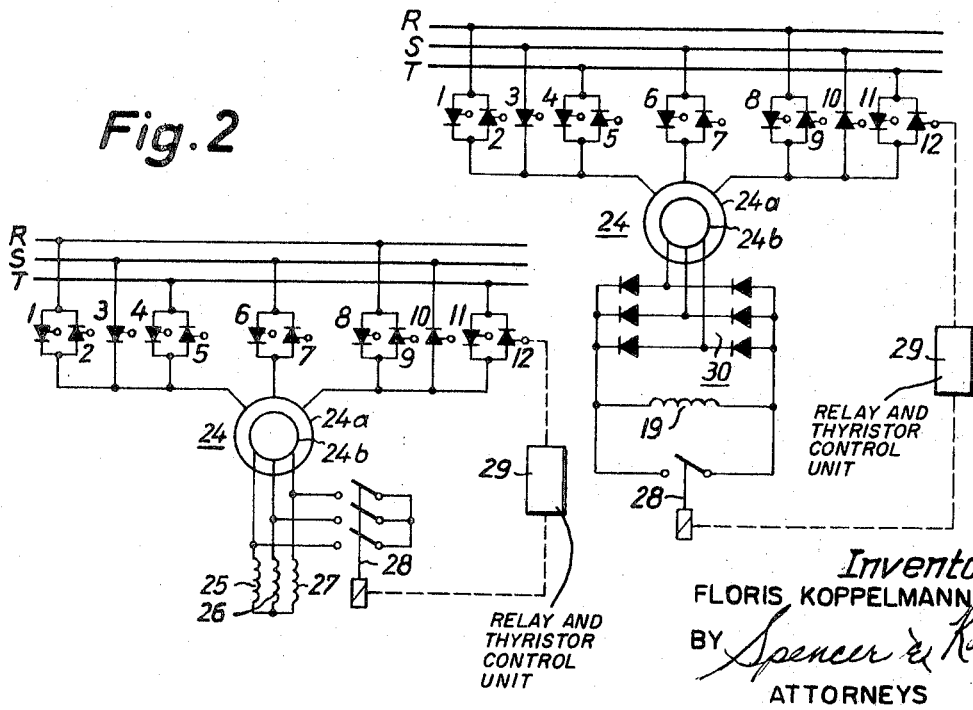
Fig.2
Fig.3
Inventor:
FLORIS KOPPELMANN
BY Spencer & Kaye
ATTORNEYS Inventor:
FLORIS KOPPELMANN
BY Spencer & Kaye
ATTORNEYS

United States Patent Office 3,348,110
Patented Oct. 17, 1967

3,348,110
ELECTRONIC CONTROL OF MOTORS
Floris Koppelmann, Berlin, Germany, assignor to Licentia Patent-Verwaltungs-G.m.b.H., Frankfurt am Main, Germany
Filed Oct. 23, 1964, Ser. No. 406,084
Claims priority, application Germany, Nov. 8, 1963, L 46,295
5 Claims. (Cl. 318—227)

The present invention relates to electric motors, and, more particularly, to asynchronous motors equipped with slip rings, it being the object of the present invention to provide a control circuit for such a motor in order to enable its operation to be controlled throughout all four quadrants. According to the present invention, the control system includes a number of thyratron-type devices such as thyristors, i.e., solid-state thyratrons which are connected on the stator side and are poled antiparallel, i.e., in opposition to each other, these thyristors being controlled differently depending on the operating condition of the motor. On the rotor side, the effective current is continuously regulated, for example, by means of an electronic pulse circuit.

Thanks to the present invention, in a preferred embodiment of which thyristors are used at the stator as well as at the rotor side, the motor can be regulated throughout its entire operating range, both with respect to rotational speed and torque, without requiring any mechanical contacts. The entire range of operation includes both driving and braking, in both forward and reverse direction. The circuitry involved has been found to be no more and in many cases less expensive than if the motor were equipped with converters or inverters. The most significant aspect of the present invention, however, is that the motor may be controlled substantially without any mechanical switches at all, and in the preferred embodiment, wholly without mechanical switches, as the rotational speed and torque may both be regulated continuously by means of the electronic components.

Yet another feature of the present invention is that the speed of the motor can be changed, and even its direction of rotation be changed, very quickly.

In essence, then, the present invention resides, mainly, in a control circuit for an asynchronous motor having a stator and a rotor, the latter being connected to slip rings, which control circuit comprises antiparallelly poled thyratron means connected between the stator and an alternating current power supply, and means connected to the slip rings for substantially steplessly regulating the current through the rotor. According to one embodiment, the thyratron means are constituted by solid-state devices, i.e., so-called thyristors, while, for very high power requirements, the stator is provided with a high-voltage winding, the thyratron means being constituted by mercury vapor rectifiers.

Additional objects and advantages of the present invention will become apparent upon consideration of the following description when taken in conjunction with the accompanying drawings in which:

FIGURE 1 is a circuit diagram of one embodiment of a control circuit according to the present invention.

FIGURE 2 is a circuit diagram of another embodiment of a control circuit according to the present invention.

FIGURE 3 is a circuit diagram of yet another embodiment of a control circuit according to the present invention.

Figure 4:
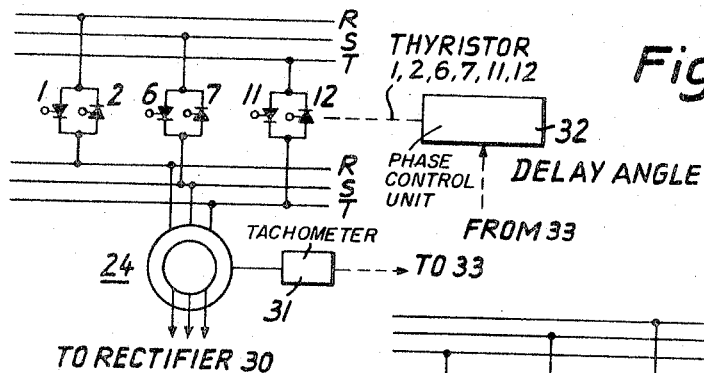
FIGURE 4 is the same circuit diagram as FIGURE 1, but there are shown only those thyristors, which must be fired if the motor shall turn clockwise. The non-conductive thyristors are not shown.

Referring now to the drawings and first to FIGURE 1 thereof in particular, the same is a circuit diagram showing a preferred embodiment of a motor control circuit according to the present invention. The motor 24 has its stator 24a connected to a three-phase current supply RST, there being twelve thyristors 1 through 12 which are controlled depending on how the motor is to operate. Each of the thyristors is a solid-state thyratron-type device, in that its control electrode—shown as emanating from the small solid black area of each thyristor symbol—is effective only to initiate the flow of current, the flow of current being interrupted upon the application of a counter voltage. The application of such a control voltage at the control electrode to render the thyristor conductive is hereinafter referred to as "firing" the thyristor.

A rectifier 30, incorporating six diodes, is connected to the rotor 24b, the rectifier 30 being connected via a choke 17 to a fixed resistor 19, having a resistance equal to R. Connected in parallel with this resistor 19 is an electronic pulse circuit by means of which the effective resistance of the resistor 19 can be changed between O and R. The electronic pulse circuit comprises a further thyristor 13, which is rendered conductive upon the application of a control voltage to its control electrode, the thyristor being rendered non-conductive periodically by the capacitor 18 whenever the thyristor 14 is rendered conductive. A further diode 15 and choke coil 16, connected in a series-circuit which itself is connected in parallel with the thyristor 14, allows the charge on the capacitor 18 to be changed.

When the motor is rotating at full speed, the rotor circuit allows the torque to be changed from zero to a desired nominal value, this being accomplished by changing the time intervals during which the pulse circuit connected in parallel with the resistor 19 is conductive, i.e., by changing the width of the pulses applied across the resistor 19. If, however, the motor 24 is at rest, only the nominal value of the torque can be reached because it is then that the maximum rotor voltage appears and that the current flowing through the resistor 19 will be equal to the rated torque, it being in this manner that the resistance R of the resistor 19 is selected initially. If, when the motor is standing still or is rotating at less than its rated speed, lower torques are to be attained, this can be done by reducing the stator voltage. The latter can be accomplished by controlling the thyristors at the stator. For one of the two possible directions of rotation, only the thyristors 1, 2, 6, 7, 11 and 12 are used. When these thyristors are fired at the proper instants, the motor will have the full line voltage RST applied to it. If, depending on the timing of the rectifiers, the firing of the thyristors is delayed, the current drawn by the motor, or the voltage applied to the motor, can be reduced from full value down to zero. It is true that certain harmonics will then appear, but this can be kept within tolerable limits so that the operation of the motor will not be worsened to any appreciable extent. This, in conjunction with the electronic control of the resistor 19, allows both the rotational speed and the torque of the motor, in one direction, to be regulated steplessly and without contacts.

For purposes of controlling the motor when the same rotates in the opposite direction, it will be the thyristors 4, 5, 6, 7, 8, 9, which are fired, while the others remain non-conductive. The stator 24a of the motor will then, depending on the firing instant of the mentioned thyristors, have applied to its a three-phase current of the opposite phase and this current can be varied steplessly, so that the rotational speed and torque of the motor can be regulated while the same rotates in the other direction.

The motor 24 can be braked by exciting the stator 24a with direct current. This can also be accomplished by means of the stator thyristors, namely, the thyristors 1, 3, 4, 9, 10 and 12, these being the only thyristors that are fired for braking purposes, the other thyristors remaining non-conductive. The thyristors 1, 3, 4, 9, 10 and 12 then form a three-phase bridge circuit which will send a direct current through two branches of the stator 24a, the amplitude of which current is dependent on the instants at which the thyristors are fired, so as to allow the braking to be regulated. At the same time, the resistance 19 connected to the rotor 24b can be regulated by means of the above-described pulse circuit, so that the braking moment can be varied steplessly throughout the entire speed range from full speed to zero. Shortly before the motor 24 comes to rest, i.e., when the motor drops below the rated slippage frequency, the direct current braking ceases to act. In order to obtain a strong braking effect even at this point of the operation, which is particularly important when the direction of rotation of the motor is to be changed, the stator-side thyristors can be switched over so that instead of applying a direct current, the stator 24a is connected to a rotary field rotating in the opposite direction so that, in conjunction with the electronic control of the resistor 19, a full or possibly partial reverse torque is applied. In this way, the frequencies appearing across the rotor 24b will not be appreciably greater than the rated frequencies. Therefore, the various circuit components, namely, the rectifier diodes, the thyristors, and the resistor in the rotor circuit, will not be subjected to voltages greatly in excess of the rated voltages.

By operating the motor in the above-described manner, the very high starting currents which usually are drawn when an asynchronous motor is first switched in will be avoided. It is true that when the motor rotates at less than rated speed, certain losses will appear at the rotor resistor 19, but these are, in practice, relatively small since the voltage applied to the motor will be kept as small as possible by means of the thyristors connected to the stator.

Alternatively, the rotor side resistor 19 can be replaced by a cascade circuit by means of which the output of the rotor is fed back, via a rectifier, into the current mains. The cascade circuit may be a conventional reactive current-free, pulse-controlled cascade circuit.

Alternatively, the rotor 24b can be made to feed energy back via suitable machinery or to a direct current bus bar, in which case the voltage or current can be matched to the bus bar by means of a pulse circuit.

Present day commercially available thyristors make it possible to operate motors connected to a 380-volt current mains by using but one triode in series. Inasmuch as present day triodes can handle current of 100 to 200 amps average, the use of twelve stator thyristor makes possible power outputs of 100 to 300 kilowatts. If the thyristors and the resistor 19 are suitably selected, it is even possible to operate the motor, for short periods of time, at double this current or even at greater currents, so that still greater torques can be obtained for short periods of time.

When the stator 24a is excited with direct current, the firing of the rectifiers effective in the stator circuit has to be delayed by almost 90°, inasmuch as the direct current is then limited only by the extremely small ohmic resistance of the stator 24a. In the case of six-pulse rectification, the direct current will then have harmonics which, at a line frequency of between 50 and 300 cycles per second, will be equal to 24% of the full direct current. These harmonics will produce a corresponding current in the stator which, however, is so small as to produce no appreciable torque, and will, therefore, not appreciably heat up the winding.

Under certain circumstances, such as if the control is not desired in both directions, or if direct current braking can be dispensed with, the twelve stator-size thyristors can be replaced by less complicated circuitry. At times it is also possible to replace some of the thyristors by simple diodes. As is well known, an asynchronous motor can be braked, instead of by exciting the stator with direct current, by rendering the stator field unsymmetrical in a certain manner. This allows a number of thyristors to be dispensed with. Since, in the type of operation described above, the motor does not start to run while it is exposed to full voltage which would produce a short-circuit-like current, the motor can be built very close, which increases its efficiency and also makes it possible to obtain the highest torque.

The pulse control circuit shown in FIGURE 1 for controlling the resistance of resistor R may be replaced by other means which control the rotor current, the main feature of the present invention being the fact that the rotor side current control is correlated with the control of the stator current by means of the stator-side thyristors. By using a larger number of thyristors on the stator side, the rotary field of the motor can be increased beyond the synchronous speed, so that the rotational speed of the motor can be higher than synchronous speed. Here, too, the stator-side thyristors will be controlled in conjunction with the rotor current.

The stator-side thyristors may also be used for producing a slowly rotating field, which may be used, for example, for so-called "inching" operation. Here, too, the operation is effected by correlating the stator voltage supply with the rotor current, so as to reduce losses in the resistor 19.

FIGURE 1 is a schematic circuit diagram. A speed of rotation control 33 is admitted by a reference value of speed of rotation.

Speed of rotation control 33 is provided simply for producing an output representing a comparison between a signal proportional to the actual value of the motor rotation speed and a signal proportional to a reference speed of rotation. Any suitable one of the many well-known, commercially available comparison devices capable of performing this operation may be used.

A tachometer 31 measures the actual value of speed of rotation. The difference of the reference and the actual value determines the delay angle of a phase control 32, so that the voltage applied to the motor is regulated. Many types of circuits for carrying out the operation of control 32 are known in the art. For example, such a circuit is described on page 351, and shown in FIGURE 3, of the publication to Griffith and Ulmer in the May, 1961, issue of Electrical Engineering. Another form of such a control circuit is shown in detail in FIGURE 3 of Patent No. 2,703,860 to Large et al.

An electronic pulse control 34 is admitted by a reference value of direct current. The difference of the reference value and the actual value measured by the current transformer 35 determines the firing of the thyristors 13 and 14, so that the effective current through the rotor is regulated corresponding to the desired torque. Control 34 is similar to control 33 and may also be constituted by any one of the many well-known, commercially available devices capable of comparing two signals and of producing outputs when a predetermined relation exists between the two compared signals.

Figure 5:
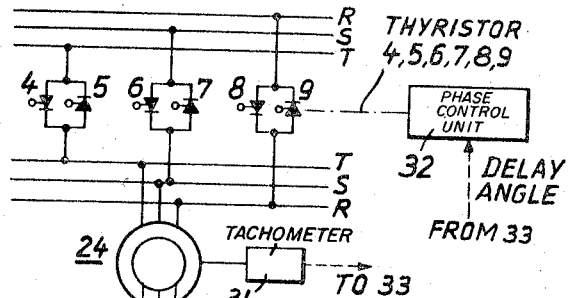
FIGURE 5 is the same circuit diagram as FIGURE 1, but there are shown only those thyristors, which must be fired if the motor shall turn anticlockwise. The non-conductive thyristors are not shown.
Figure 6:
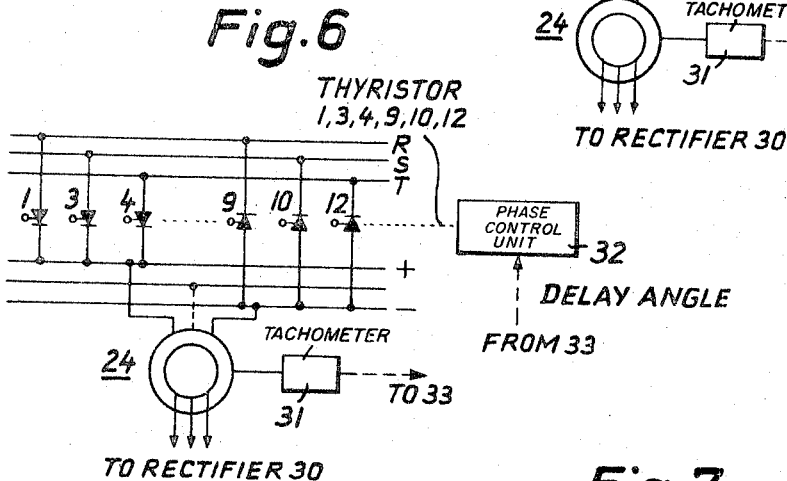
FIGURE 6 is the same circuit diagram as FIGURE 1, but there are shown only those thyristors, which must be fired if the motor shall be braked by exciting the stator 24a with direct current. The non-conductive thyristors are not shown.
Figure 7:
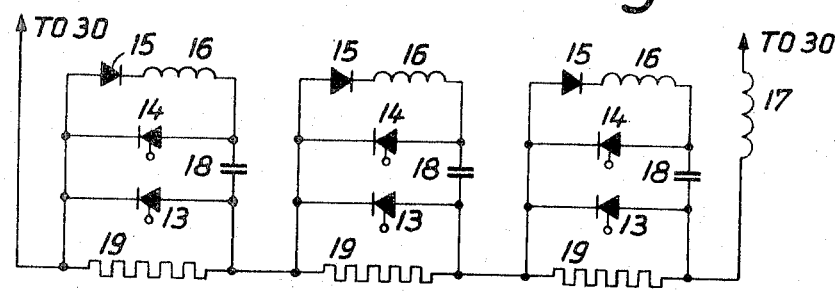
FIGURE 7 is a part of a circuit diagram as shown in FIGURE 1, wherein thyristor 13 is replaced by a plurality of serially connected thyristors each connected in parallel with a respective fixed portion of the rotor resistance.

FIGURES 4, 5 and 6 show the control of the thyristors 1 through 12 of the stator.

In FIGURE 4 the motor shall turn clockwise,

In FIGURE 5 the motor shall turn anticlockwise,

In FIGURE 6 the motor shall be braked by exciting the stator with direct current.

According to a further feature of the present invention, the rotor circuit includes resistor means which, when the stator-side thyristors have already applied the full voltage to the motor so that the same operates at full speed, are bridged by means of a switch, thereby to allow the motor to be operated at a still higher speed. Thus, while the stator-side thyristors already provide a wide speed range, the same is increased even further. This feature is of particular significance under circumstances where it is important to reduce the costs of the circuitry and nevertheless obtain as wide a speed range as possible. The rotor circuit then includes resistors which are connected to the slip rings, the resistors having such resistances that at full stator control, it will be the rated current, or, if desired, twice the rated current of the motor, which flows. These three resistors can then be bridged by means of a relay, as a result of which the rotational speed of the motor is increased even further.

FIGURE 2 shows such an arrangement in which three slip rings connected to the winding of rotor 24b lead to three resistors 25, 26, 27. The latter can be bridged by means of three ganged switches operated jointly by a relay 28. The relay 28 is operated by a control device 29 which actuates the relay when, with the thyristors already causing the motor to rotate at full speed, a still higher speed is desired. This also ensures that the switching will not result in any abrupt change in the current or torque.

Device 29 includes circuits comparable to the units 31, 32 and 33 of FIGURE 1 plus a suitable relay control unit.

The circuit of FIGURE 3 differs from that of FIGURE 2 in that the output of the rotor 24b is connected, via a rectifier 30, to a resistor 19. This resistor can be short-circuited by means of relay 28.

According to a further feature of the present invention, the motor may be operated at voltages higher than 500 volts by using at the stator side, antiparallely controlled mercury vapor rectifiers, or so-called Enitrons, the motor having a high voltage winding on the stator. This allows the motor to be used in the 500 to 5000 kilowatt range.

The rotor side is controlled by means of pulsed serially connected thyristors, each of which has a fixed portion of the rotor resistance in parallel with it. Such an arrangement can make use of a twelve pulse rectifier connected via a conventional phase shifter autotransformer. The sinusoidal shape of the current will then be approached more closely, and the motor is used more efficiently, there being smaller torque fluctuations.

It will be understood that the above description of the present invention is susceptible to various modifications, changes and adaptations, and the same are intended to be comprehended within the meaning and range of equivalents of the appended claims.

What is claimed is:
1. In combination with a three phase power supply mains and an asynchronous motor including a three-phase stator and a rotor having slip rings connected thereto, a control circuit for controlling said motor in such a manner as to cause it to be rotated in either direction over a wide range of speeds and to be braked by a direct current for either direction of rotation, said circuit comprising:
  (a) stator side control means consisting of a first pair of thyristors connected in parallel opposition between a first phase of said mains and a first phase of said stator, a first individual thyristor connected between a second phase of said mains and said first phase of said stator in such a manner as to conduct in a forward direction toward said stator, a second pair of thyristors connected in parallel opposition between a third phase of said mains and said first phase of said stator, a third pair of thyristors connected in parallel opposition between said second mains phase and a second phase of said stator, a fourth pair of thyristors connected in parallel opposition between said second mains phase and a third phase of said stator, a second individual thyristor connected between said second mains phase and said third stator phase in such a manner as to conduct in a forward direction away from said stator, and a fifth pair of thyristors connected in parallel opposition between said third mains phase and said third stator phase;
  (b) resistor means connected between said slip rings; and
  (c) electronic switching means connected in parallel with said resistor means for periodically short circuiting said resistor means.

2. An arrangement as defined in claim 1 wherein said resistor means are constituted by a plurality of serially connected resistors and said electronic switching means are constituted by a plurality of serially connected thyristors each connected in parallel with a respective one of said resistors.

3. An arrangement as defined in claim 1 further comprising means for controlling the conduction periods of said two individual thyristors and of one thyristor of each of said first, second, fourth and fifth pairs for causing a direct current to be applied to said first and third stator phases in order to brake said motors.

4. An arrangement as defined in claim 1 further comprising means connected to said electronic switching means for controlling the opening and closing thereof at a high rate with respect to the frequency of the voltages appearing on said power supply mains so as to vary the average resistance which said resistor means presents to said rotor for permitting the rotational speed of said motor to be increased with respect to the speed at which said motor rotates when full voltage is applied to said stator and said resistor means are not short circuited.

5. In combination with a three phase power supply mains and an asynchronous motor including a three phase stator and a rotor having slip rings connected thereto, a control circuit for applying direct current to each of said stator phases for braking said motor, said circuit comprising stator side control means including a first set of three thyristors each connected between a different respective phase of said mains and one and the same phase of said stator in such a manner as to conduct in a forward direction toward said stator, and a second set of three thyristors each connected between a different respective phase of said mains and a second phase of said stator in such a manner as to conduct in a forward direction away from said stator.

References Cited
UNITED STATES PATENTS
| | | | |
|---|---|---|---|
| 2,876,406 | 3/1954 | Charbonneaux | 318—227 |
| 2,703,860 | 3/1955 | Large | 318—227 |
| 3,129,368 | 4/1964 | Burnett | 318—345 |

OTHER REFERENCES
AEG-Mitteilungen, 1962, Hochrainer, Die Entwicklung des Siebharzschalters, pp. 57, 58.

Electrical Engineering, May 1961, Griffith, Semiconductor Variable Speed Drive, pp. 350–353.

Solid State Thyraton Switches Kilowatts, Electronics, March 1958, pp. 52–55.

ORIS L. RADER, *Primary Examiner.*

G. Z. RUBINSON, *Assistant Examiner.*